(12) United States Patent
Rushd

(10) Patent No.: US 12,115,465 B1
(45) Date of Patent: Oct. 15, 2024

(54) SYSTEM AND METHOD FOR SUSTAINABLE PRODUCTION OF WATER AND SALT

(71) Applicant: KING FAISAL UNIVERSITY, Al-Ahsa (SA)

(72) Inventor: Sayeed Rushd, Al-Ahsa (SA)

(73) Assignee: KING FAISAL UNIVERSITY, Al-Ahsa (SA)

( * ) Notice: Subject to any disclaimer, the term of this patent is extended or adjusted under 35 U.S.C. 154(b) by 0 days.

(21) Appl. No.: 18/429,743

(22) Filed: Feb. 1, 2024

(51) Int. Cl.
| | |
|---|---|
| *B01D 3/00* | (2006.01) |
| *B01D 1/00* | (2006.01) |
| *B01D 1/22* | (2006.01) |
| *B01D 5/00* | (2006.01) |
| *C02F 1/04* | (2023.01) |
| *C02F 1/08* | (2023.01) |
| *C02F 1/14* | (2023.01) |
| *C02F 1/46* | (2023.01) |
| *C02F 103/08* | (2006.01) |

(52) U.S. Cl.
CPC ............ *B01D 1/0035* (2013.01); *B01D 1/22* (2013.01); *B01D 5/009* (2013.01); *C02F 1/043* (2013.01); *C02F 1/08* (2013.01); *C02F 1/14* (2013.01); *C02F 1/4608* (2013.01); *C02F 2103/08* (2013.01); *C02F 2201/002* (2013.01); *C02F 2303/04* (2013.01)

(58) Field of Classification Search
CPC ........ B01D 3/00; B01D 1/0035; C02F 1/4604
USPC .............................. 203/10; 202/234; 159/904
See application file for complete search history.

(56) References Cited

U.S. PATENT DOCUMENTS

| | | | |
|---|---|---|---|
| 4,363,703 A | 12/1982 | Eldifrawi et al. | |
| 7,328,584 B2 | 2/2008 | Craven | |
| 10,829,913 B1 * | 11/2020 | Ahmed | ................ B01D 61/025 |

(Continued)

FOREIGN PATENT DOCUMENTS

| | | |
|---|---|---|
| CN | 101704560 A | 5/2010 |
| CN | 110272083 A | 9/2019 |

(Continued)

OTHER PUBLICATIONS

Product "Solar Still," John Ayres, in Solar Energy Conversion II, 1981.

*Primary Examiner* — Monzer R Chorbaji
(74) *Attorney, Agent, or Firm* — Nath, Goldberg & Meyer; Joshua B. Goldberg

(57) ABSTRACT

A system for production of water and salt is disclosed. The system includes a power source, a solar still, a brine collector, an atmospheric water generator and a plasma treatment chamber. The solar still includes a saltwater inlet, a brine outlet, a humid air outlet, and at least one transparent window for directing solar radiation into the solar still and heating incoming saltwater. The brine collector receives brine from the solar still and performs a drying process to produce salt. The atmospheric water generator includes a humid air inlet connected to the humid air outlet of the solar still and is configured to generate freshwater which is directed to a plasma treatment chamber for production of plasma activated water. The solar still may include a flow management structure of multiple transparent layers for increased efficiency. The multiple transparent layers may be inclined and formed of a synthetic polymer.

11 Claims, 3 Drawing Sheets

(56) References Cited

U.S. PATENT DOCUMENTS 11,505,476 B1    11/2022  Sherif et al.
2021/0163319 A1* 6/2021   Kwak .................. C02F 1/4604

FOREIGN PATENT DOCUMENTS

CN    210885391 U   6/2020
GB      2450486 A   12/2008

* cited by examiner

SYSTEM AND METHOD FOR SUSTAINABLE PRODUCTION OF WATER AND SALT

BACKGROUND

Field

The disclosure of the present patent application relates to water treatment, and particularly to a system for desalination and production of water and salt.

Description of Related Art

Many regions around the world face water scarcity due to a lack of freshwater resources. Desalination and water purification provide an alternative water source by converting seawater/saltwater into freshwater, helping alleviate water shortages.

As the global population continues to grow, the demand for freshwater increases. Desalination offers a sustainable solution to meet the growing water demand. Additionally, the extraction of valuable minerals, such as salt, from seawater is of interest. However, the traditional methods of salt extraction such as salt mining are often inefficient and can lead to environmental degradation. Therefore, there is a need for innovative solutions that can address these challenges in a sustainable and efficient manner.

One solution offered that has emerged is the use of solar stills, which utilize the energy from sunlight to evaporate water, separate the pure water vapor from impurities, and condense the vapor back into liquid form to produce freshwater. Typical solar stills include a chamber for collection of seawater or contaminated water in which a single layer, the top layer, is exposed to sunlight, which can lead to slow evaporation of the water and low efficiency. An improved design for solar stills addressing these problems is desired.

In addition, another promising technology which addresses water scarcity is atmospheric water generation (AWG). AWG may be used to provide a source of water independent of location, making it beneficial for remote or isolated areas where traditional water infrastructure is limited, and improving water scarcity in regions that are difficult to reach or otherwise lack access to fresh water. Agriculture and industrial processes often require large amounts of water. Desalination and atmospheric water generation can support these sectors by providing a steady and additional water supply, reducing dependence on conventional freshwater sources.

Another technology of growing interest is plasma-activated water, which is formed by treating water with plasma, a state of matter containing ionized gas. Plasma activation imparts unique properties to water, including a demonstrated ability to inactivate a wide range of microorganisms, including bacteria, viruses, and fungi. This antimicrobial property makes it useful for disinfection purposes. Plasma activation can enhance the water treatment process by promoting the breakdown of organic contaminants and improving the removal of pollutants. This can be relevant in treating water for consumption or industrial use.

Systems and methods are desired which take advantage of these new technologies while also addressing the challenge of resource scarcity.

SUMMARY

A system for production of water and salt is disclosed herein, the system comprising a power source, a solar still, a brine collector, an atmospheric water generator and a plasma treatment chamber. The solar still includes a saltwater inlet, a brine outlet, a humid air outlet, and at least one transparent window for directing solar radiation into the solar still and heating incoming saltwater. The brine collector receives brine from the solar still and performs a drying process to produce salt. The atmospheric water generator includes a humid air inlet connected to the humid air outlet of the solar still, the atmospheric water generator being configured to generate fresh water from the humid air produced by the solar still and direct the freshwater through a freshwater outlet. The plasma treatment chamber includes a freshwater inlet that accepts freshwater from the freshwater outlet of the atmospheric water generator. The plasma treatment chamber is configured to treat the freshwater with plasma, further purifying the freshwater from the atmospheric water generator and dispensing plasma activated water.

The solar still used for the production of water and salt may include a saltwater feed inlet at a higher elevation than a brine outlet and include a flow management structure. The flow management structure can include multiple layers that direct the flow of saltwater from the inlet along the multiple layers to the brine outlet. In an embodiment, the flow management structure can include multiple inclined surfaces. The multiple inclined surfaces may be transparent or translucent for increased exposure of the saltwater to solar radiation. The multiple inclined surfaces may be formed of a synthetic polymer such as polymethyl methacrylate.

A process for producing water and salt is disclosed herein. The process includes feeding saltwater to a solar still unit where the saltwater is exposed to solar radiation to produce humid air and brine. The brine is fed to a brine storage container where it is dried to produce salt. Humid air from the solar still is directed to an atmospheric water generator to produce freshwater from the humid air. Freshwater from the atmospheric water generator is directed to a plasma treatment chamber which performs plasma treatment on the freshwater to produce plasma activated water.

Further disclosed is a desalination system. The desalination system includes a power source, a solar still, an atmospheric water generator, and a plasma treatment chamber. The solar still receives saltwater and heats the saltwater by solar radiation to produce humid air. The atmospheric water generator receives the humid air produced by the solar still and produces freshwater through cooling and condensing of the humid air. The plasma treatment chamber receives the freshwater produced by the atmospheric water generator and produces plasma activated water through plasma treatment of the freshwater. The solar still may include multiple inclined surfaces which direct heated saltwater to a brine outlet. The multiple inclined surfaces may be transparent or translucent and may be formed of a synthetic polymer such as polymethyl methacrylate. The desalination system may include a brine storage container which accepts brine from the solar still and subjects the brine to a drying process to produce salt.

These and other features of the present subject matter will become readily apparent upon further review of the following specification.

BRIEF DESCRIPTION OF DRAWINGS

Similar reference characters denote corresponding features consistently throughout the attached drawings.

DETAILED DESCRIPTION

Figure 1:
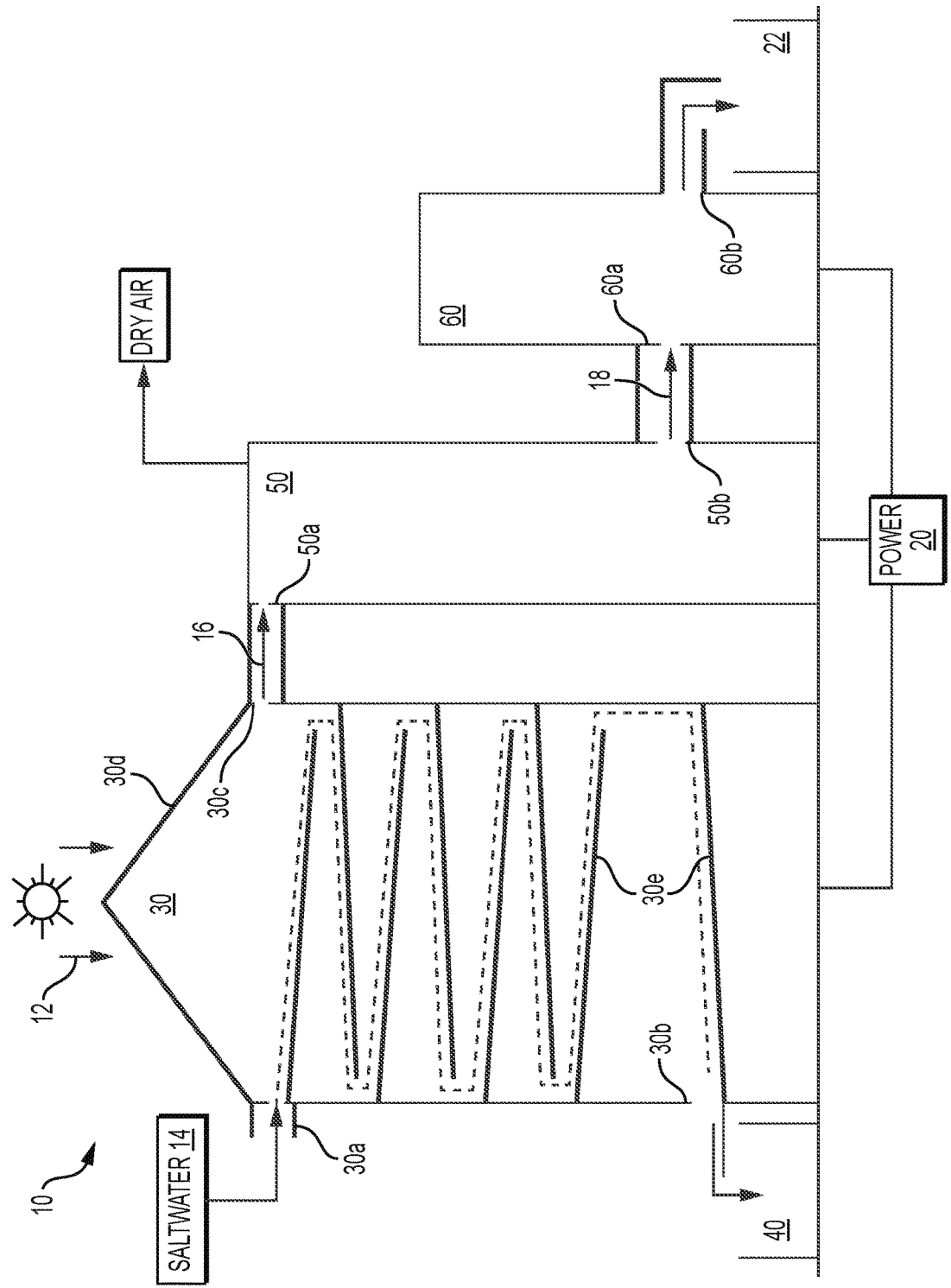
FIG. 1 is a diagram of a system for production of water and salt.

A system 10 for desalination as well as production of water and salt is disclosed herein, system 10 including power source 20, solar still 30, brine collector 40, atmospheric water generator 50 and plasma treatment chamber 60. Power source 20 may be any combination of electric power sources including solar panels, batteries, fuel cells, wind power, and the power grid, among others. The solar still 30 includes a saltwater inlet 30a, a brine outlet 30b, a humid air outlet 30c, and at least one transparent window 30d for directing solar radiation 12 into the solar still and heating incoming saltwater. The brine collector 40 receives heated saltwater which has been turned to brine. A drying process may be performed on the brine to produce salt. The drying process may involve evaporation due to sun exposure, as well as additional heating means.

In a non-limiting embodiment, solar still 30 includes a saltwater feed inlet 30a at a higher elevation than a brine outlet 30b and includes a flow management structure. The flow management structure includes multiple layers 30e, which direct the flow of saltwater from the inlet 30a along the multiple layers 30e to the brine outlet 30b. The multiple layers 30e may be transparent or translucent for increased exposure of the saltwater to solar radiation. Multiple layers 30e may be formed of a synthetic polymer such as polymethyl methacrylate (PMMA), also known under the trade name Plexiglass. Multiple layers 30e may be inclined, such as between 1°-5° from a horizontal plane, to allow increased exposure of the saltwater to the incoming solar rays.

The atmospheric water generator 50 includes a humid air inlet 50a connected to the humid air outlet 30c of the solar still 30, the atmospheric water generator 50 being configured to generate freshwater 18 from the humid air 16 produced by the solar still 30 and direct the freshwater 18 through a freshwater outlet 50b. The plasma treatment chamber 60 includes a freshwater inlet 60a that accepts freshwater 18 from the freshwater outlet 50b of the atmospheric water generator 50. Plasma treatment chamber 60 is configured to treat the freshwater 18 with plasma, further purifying freshwater 18 and dispensing plasma activated water 22.

Figure 2:
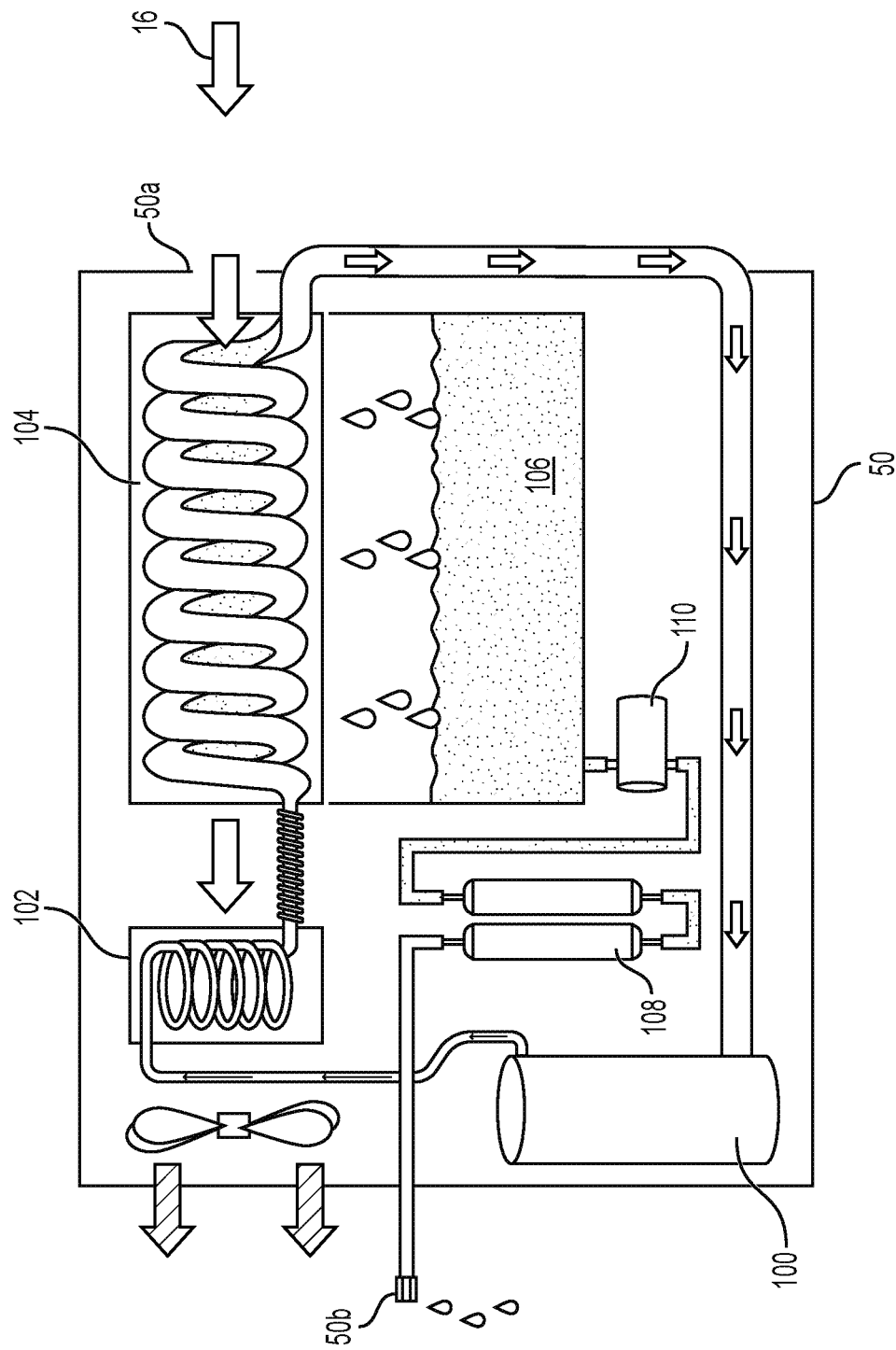
FIG. 2 is a diagram of elements included in an atmospheric water generator.

FIG. 2 shows example components of a typical atmospheric water generator (AWG) such as might be used in the system 10 of FIG. 1. A cooling condensation type AWG uses a compressor 100 to circulate refrigerant through a condenser 102 and then an evaporator coil 104 that cools the incoming air 16. Once the air temperature reaches its dew point, water condenses into a collector 106. A pump 110 and purification/filtration system 108 may be used for circulating the water and reducing the risk posed by ambient microorganisms.

Figure 3:
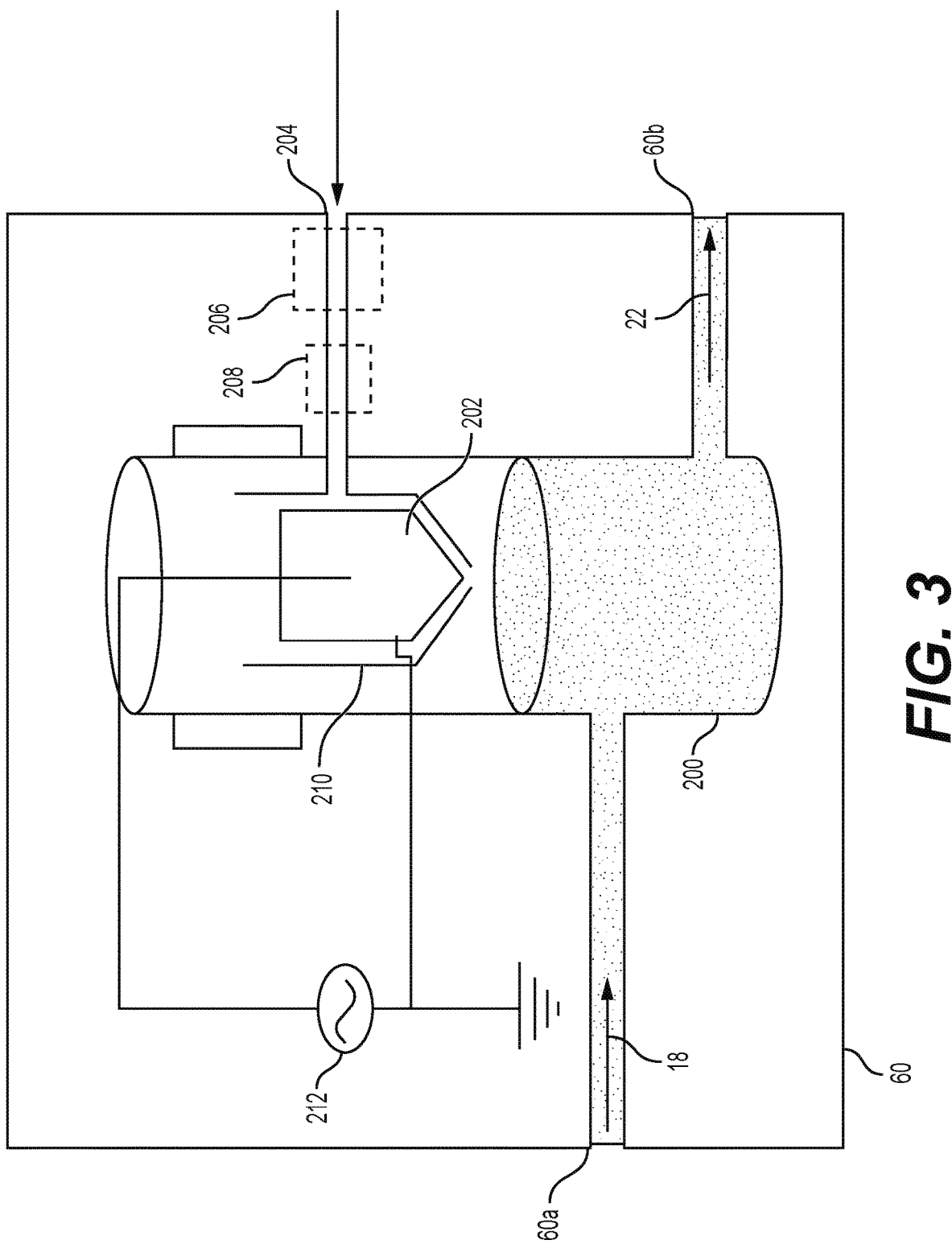
FIG. 3 is a diagram of elements included in a plasma treatment chamber.

FIG. 3 depicts example elements included in plasma treatment chamber 60 including chamber body 200 which holds the incoming freshwater 18 to be treated. At least one electrode 202 can be used to generate plasma. Incoming air/gas can be supplied through inlet 204. An optional compressor 206 and flow controller 208 may be included as well. Electrode 202 can be held within a dielectric container 210 which can withstand high voltages without conducting electricity. Voltage source 212 can supply the current needed by electrode 202 to generate plasma which is directed onto the incoming water to produce outgoing plasma activated water 22.

It is to be understood that the systems and methods for production of water and salt are not limited to the specific embodiments described above, but encompasses any and all embodiments within the scope of the generic language of the following claims enabled by the embodiments described herein, or otherwise shown in the drawings or described above in terms sufficient to enable one of ordinary skill in the art to make and use the claimed subject matter.

The invention claimed is:

1. A system for production of water and salt, the system comprising:
    a power source;
    a solar still, wherein the solar still includes a saltwater inlet, a brine outlet, a humid air outlet, and at least one transparent window for directing solar radiation into the solar still and heating incoming saltwater, wherein the saltwater inlet of the solar still is at a higher elevation than the brine outlet and wherein a flow management structure including multiple layers directs flow of saltwater from the saltwater inlet along the multiple layers to the brine outlet;
    a brine collector, wherein the brine collector receives brine from the solar still which undergoes a drying process to produce salt;
    an atmospheric water generator, wherein the atmospheric water generator includes a humid air inlet connected to the humid air outlet of the solar still, the atmospheric water generator configured to generate freshwater from humid air produced by the solar still and direct the freshwater through a freshwater outlet; and
    a plasma treatment chamber, wherein the plasma treatment chamber includes a freshwater inlet that accepts freshwater from the freshwater outlet of the atmospheric water generator, the plasma treatment chamber configured to perform plasma treatment on the freshwater from the atmospheric water generator and dispense plasma activated water.

2. The system for production of water and salt as recited in claim 1, wherein the flow management structure includes multiple inclined surfaces.

3. The system for production of water and salt as recited in claim 2, wherein the multiple inclined surfaces are each inclined between 1° and 5° from a horizontal plane.

4. The system for production of water and salt as recited in claim 2, wherein the multiple inclined surfaces are each transparent or translucent.

5. The system for production of water and salt as recited in claim 4, wherein the multiple inclined surfaces are each formed of polymethyl methacrylate.

6. A process for producing water and salt comprising:
    feeding saltwater to a solar still unit where the saltwater is exposed to solar radiation to produce humid air and brine, wherein the solar still includes a flow management structure including multiple layers which direct flow of saltwater from a saltwater inlet along the multiple layers to a brine outlet;
    feeding the brine to a brine storage container where it is dried to produce salt;
    directing the humid air from the solar still to an atmospheric water generator to produce freshwater from the humid air; and directing the freshwater from the atmospheric water generator to a plasma treatment chamber which performs plasma treatment on the freshwater to produce plasma activated water.

7. A desalination system comprising:

a power source;

a solar still, wherein the solar still receives saltwater and heats the saltwater by solar radiation to produce humid air and wherein the solar still includes multiple inclined surfaces which direct incoming saltwater to a brine outlet;

an atmospheric water generator, wherein the atmospheric water generator receives the humid air produced by the solar still and produces freshwater through cooling and condensing of the humid air; and a plasma treatment chamber, wherein the plasma treatment chamber receives the freshwater produced by the atmospheric water generator and produces plasma activated water through plasma treatment of the freshwater.

8. The desalination system as recited in claim 7, wherein multiple inclined surfaces are each angled between 1° and 5° from a horizontal plane.

9. The desalination system as recited in claim 8, wherein the multiple inclined surfaces are each transparent or translucent.

10. The desalination system as recited in claim 9, wherein the multiple inclined surfaces are each formed from polymethyl methacrylate.

11. The desalination system as recited in claim 7, further comprising:

a brine storage container which accepts brine from the solar still where the brine is subjected to a drying process to produce salt.

* * * * *